United States Patent

[11] 3,630,214

| [72] | Inventor | Kenneth A. Levering<br>North Adams, Mich. |
|---|---|---|
| [21] | Appl. No. | 233 |
| [22] | Filed | Jan. 2, 1970 |
| [45] | Patented | Dec. 28, 1971 |
| [73] | Assignee | Aeroquip Corporation<br>Jackson, Mich. |

[54] FRANGIBLE COUPLING
7 Claims, 3 Drawing Figs.

[52] U.S. Cl............................................. 137/68,
137/375, 285/3
[51] Int. Cl................................................. F16k 17/40
[50] Field of Search........................................... 137/38, 39,
68-71, 316, 614, 797; 73/333; 285/2, 3

[56] References Cited
UNITED STATES PATENTS

| 368,197 | 8/1887 | Drummond | 73/333 |
| 1,253,727 | 1/1918 | Robinson | 73/333 |
| 2,607,226 | 8/1952 | Biscoe | 73/333 |
| 345,156 | 7/1886 | Little | 137/71 X |
| 2,607,227 | 8/1952 | Biscoe | 73/333 |
| 3,043,542 | 7/1962 | Neuschotz | 137/68 X |
| 3,273,578 | 9/1966 | Clark | 137/68 |

FOREIGN PATENTS

| 8,724 | 10/1913 | Great Britain | 73/333 |

*Primary Examiner*—M. Cary Nelson
*Assistant Examiner*—Richard Gerard
*Attorney*—Jerry K. Harness ABSTRACT: A fluid coupling which connects parts such as an aircraft fuel cell and hose, and yields in case of a crash to prevent fluid from escaping. The coupling has a pair of poppet valves spring urged toward their closed positions, and held open by a collapsible rod. The coupling has a frangible neck and a stretchable rubber liner the ends of which act as valve seats. Breaking of the frangible neck will cause the rod to release the valves, permitting them to close. In one embodiment, shearpins connect two parts of the coupling so that tensile forces created by a crash will likewise release the valves.

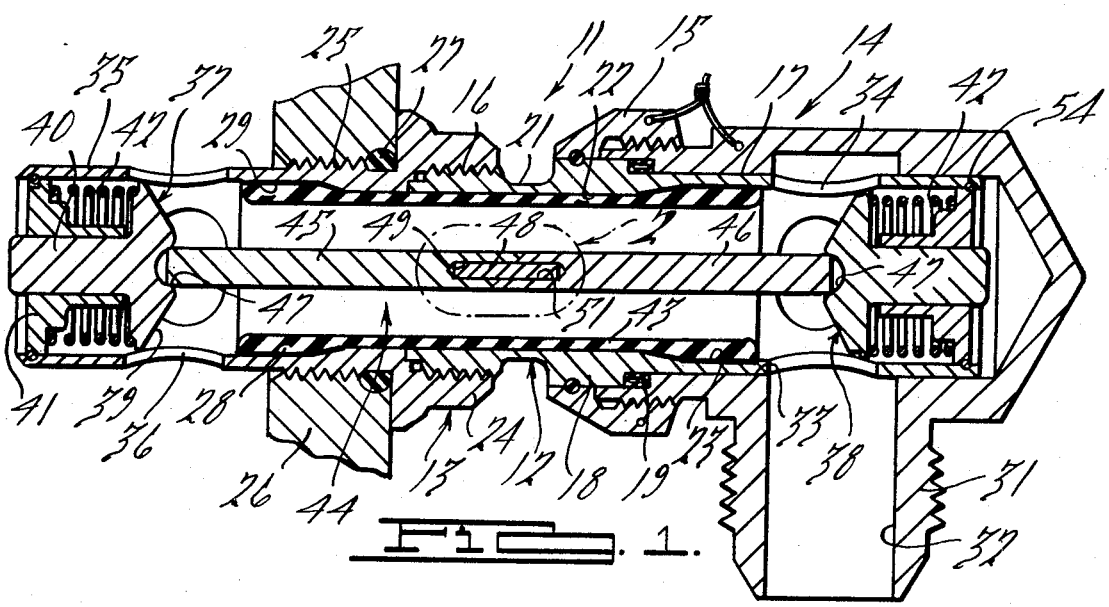

FRANGIBLE COUPLING

BACKGROUND OF THE INVENTION

1. Field of the Invention

The invention relates to couplings which connect fuel or oil tanks, lines and fittings on helicopters and other aircraft. In case of a crash, the ports of these tanks, lines and fittings could be opened, permitting fuel or oil to escape with the consequent danger of explosion and fire. The coupling is intended to prevent such escape of fluid, either by breaking in such a manner that valves on the parts will automatically close, or distorting in such a way that a leakproof connection will be maintained.

2. Description of the Prior Art

No prior safety device of this type is known which will shut off the escape of fluid upon crash-induced separation of fuel tanks, lines or fittings.

BRIEF SUMMARY OF THE INVENTION

The invention comprises an elongated body having fittings at opposite ends for securing to a fuel tank, hose line or the like. The central portion of the body is of thin-walled construction, thus providing a frangible neck. The body is lined with a rubberlike tube extending between the fittings and secured to the body by bonding only at its end portions so that the remainder is free to stretch. A pair of poppet valves adjacent the fittings are spring urged toward closed positions, seating against the opposite ends of the rubber liner. However, these valves are held in their open positions by a two-piece rod having a scarfed joint connected by a shearpin, so that compression, bending or shear forces which break the frangible neck will cause the rod to collapse or dislodge itself from the valves, permitting the valves to close. The rubber liner will prevent leakage in the event of partial breakage of the neck which does not result in collapse or dislodgement of the two-piece rod.

In a second embodiment of the invention, intended to react to tension as well as shear and bending forces, a plurality of radially disposed shearpins connect two parts of the coupling body, so that the parts may spread apart in response to a crash, removing the rod from its valve-holding position.

BRIEF DESCRIPTION OF THE DRAWINGS

FIG. 1 is a cross-sectional view in elevation of a coupling incorporating the principles of this invention and especially adapted for operating in response to shear, bending and compression loads;

FIG. 2 is a fragmentary cross-sectional view taken in the area 2 of FIG. 1, and

FIG. 3 is a cross-sectional view of a second embodiment of the invention in which shearpins connect two parts of the body so that the coupling will operate under tension as well as shear and bending.

DESCRIPTION OF THE PREFERRED EMBODIMENTS

Referring first to the embodiment of FIGS. 1 and 2, the coupling is generally indicated at 11 and comprises a body generally indicated at 12 to which are attached a tank fitting generally indicated at 13 and a hose fitting generally indicated at 14. Fitting 13 is directly threaded onto body 12 whereas fitting 14 is secured to the body by a nut 15. Parts 12 to 15 together form a combined body-fitting assembly.

Body 12 comprises an externally threaded portion 16 on which fitting 13 is mounted, and a cylindrical portion 17 which carries fitting 14. Nut 15 is rotatably mounted on an enlarged portion 18 of body 12 and threadably engages fitting 14 to draw the fitting against a seal 19 carried by body 12.

A frangible portion 21 is formed on body 12 between portions 16 and 18. Portion 21 is narrow-necked section which will be subject to breakage in response to compressive or bending forces on body 12. These would result from a crash in which relative movement would occur between the parts to which fittings 13 and 14 are attached.

A bore 22 extends through body 12 and leads to a slightly larger bore 23 inside portion 17 of body. Fitting 13 has an internally threaded portion 24 mounted on body portion 16, and an externally threaded portion 25 which is secured to an object such as a fuel cell or tank 26 containing flammable aviation fuel. A seal 27 is disposed between fitting 13 and tank 26. The fitting is provided with a bore 28 contiguous with bore 22 of the body, a portion 29 of this bore being widened to the same diameter as bore portion 23.

Fitting 14 is L-shaped and has an externally threaded leg 31 for connection to a hose (not shown). A bore 32 extending through leg 31 is connected with a bore 33 which slips onto portion 17 of body 12. This portion of the body has a plurality of apertures 34, and an extension 35 of fitting 13 likewise has a plurality of apertures 36 inside tank 26. A passage is thus formed from the tank through body 21 and fitting 14 to the hose.

The means for sealing the tank and hose ports in the event of a crash comprises a pair of poppet valves generally indicated at 37 and 38 and disposed within portion 35 of fitting 13 and portion 17 of body 12 respectively. Each p poppet valve comprises a frustoconical surface 39 and a cylindrical portion 40 slidable in a guide 41 mounted in fitting portion 35 or body portion 17. A spring 42 urges each poppet valve toward a closed position in which it engages the adjacent end of a rubber liner 43 within body 12 and fitting 13. This rubber liner extends through bores 22 and 28 and is bonded only to bore portions 23 and 29. The liner is thus able to stretch should neck 21 be partially fractured, preventing leakage of the fuel.

Means are provided for holding valves 37 and 38 in their open positions except in the event of a crash. This means comprises a two-piece rod generally indicated at 44 and having aligned sections 45 and 46. The outer ends of these sections are received by recesses 47 in the two valves, and the combined length of sections 45 and 46 is such that the rod will hold the valves in their open position as shown in FIG. 1.

A shearpin 48 connects the two sections of rod 44, this shearpin being received by recesses 19 and 51 in the facing ends 52 and 53 of rod sections 45 and 46 respectively. As shown in FIG. 2, the facing ends are scarfed, that is, cut at complementary angles, so that a compressive force on rod 44 will cause pin 48 to shear in the plane of these abutting scarfed surfaces.

In operation, the parts will normally be in their FIG. 1 position. Should a crash occur which causes neck 21 to break due to bending forces between fittings 13 and 14, the ends of rod 44 will become dislodged from recesses 47 in poppet valves 37 and 38, permitting springs 42 to close the valves and prevent leakage of fuel. Shear forces occurring between fittings 13 and 14 which cause neck 21 to break will likewise cause separation of rod 44 from the valves, allowing them to close. Compressive forces between the two fittings which collapse neck 21 will cause shearpin 48 to fracture, the forces being transmitted through guides 41, valves 37 and 38, and rod sections 45 and 46. Rod 44 will thus release itself from the valves, permitting them to close.

It should be noted that retaining rings 54 which hold guides 41 in place are engaged by arcuate grooves on the outer edges of the guides, so that the rings are forced outwardly against their respective fittings as a reaction to the compressive forces described above. This will prevent the retaining rings from accidentally becoming dislodged.

Should the crash be such that neck 21 partially cracks or separates but does not fracture sufficiently to release rod 44 from the valves, rubber liner 43 will stretch as necessary to prevent leakage of fuel through neck 21.

FIG. 3 illustrates another embodiment of the invention which is especially adapted for preventing leakage in a connection between two tanks when a crash occurs. In such cases, tensile as well as shear or bending forces are likely to occur between the two tanks. The coupling is generally indicated at 101 and is shown as connecting two fuel tanks 102 and 103, these fuel tanks being adjacent each other but separated by a solid bulkhead 104 so that compressive forces between the two tanks cannot ordinarily be developed when a crash occurs.

Coupling 101 has a combined body-fitting assembly generally indicated at 105, this assembly comprising fittings 106 and 107 attached to tanks 102 and 103 respectively. The means for attaching fitting 106 to tank 102 comprises nuts 108 and 109 mounted on externally threaded portions of fitting 106. Fitting 107 is attached to tank 103 by a nut 111 which holds the tank against a flange 112 on the fitting.

Fitting 106 has a narrow section 113 extending into a bore 114 in a section of fitting 107. The latter has a plurality of circumferentially disposed radially extending shearpins 115, these pins extending into a slot 116 formed on section 113 of fitting 106. The construction of these shearpins is such that a tensile force between fittings 106 and 107 created by a crash will cause them to shear, thus separating the two fittings.

Fittings 106 and 107 have extensions 117 and 118 respectively in their respective tanks, these extensions being provided with apertures 119 and 121 for the passage of fuel into the fitting interiors. Poppet valves 122 and 123 are carried by extensions 117 and 118 respectively, and are supported by guides 124 and 125 similarly to the previous embodiment. The valves are urged by springs 126 and 127 to closed positions against the facing ends of a rubber liner 128, this rubber liner being bonded at its end portions 129 and 131 to fittings 106 and 107 respectively.

A two-piece rod 132 is provided for holding poppet valves 122 and 123 in their open positions. The scarfed facing ends of the two sections 133 and 134 of this pin are connected by a shear pin 135 as in the previous embodiment, and the outer ends of rod 132 are held in recesses 136 and 137 of poppet valves 122 and 123 respectively. A portion 138 of fitting section 113 is of reduced diameter, providing a narrow-necked region which is subject to fracture in the event of a crash which creates bending or shear forces between the fittings.

In operation of the embodiment of FIG. 3, the parts will normally be in the position shown, but in the event of a crash which creates a tensile force between fittings 106 and 107, the fittings will separate with the shearing of pins 115. This will cause rod 132 to drop out of its holding position and valves 122 and 123 will close, preventing leakage from tanks 102 and 103.

Should a shear force be created between fittings 106 and 107 in response to the crash, the narrow necked portion 138 of fitting 106 will fracture, permitting rod 132 to become dislodged from its valve-holding position. Partial breaking of neck 138 will not result in leakage since liner 128 may stretch as in the previous embodiment. A bending force between fittings 106 and 107 created by a crash will likewise result in fracturing of neck portion 138, shearing of pins 115, or both, with the consequent dislodgement of rod 132 from its valve-holding position.

What is claimed is:

1. In a coupling for preventing fluid leakage in the event of a crash, a body-fitting assembly having fittings at its opposite ends, means on said fittings for securing the assembly to two fluid-carrying parts, a pair of valves carried by said fittings, springs urging said valves toward their closed positions, rod means extending between the valves and holding them in their open position, said rod means comprising separable portions, frangible means connecting the separable portions to form a substantially unitary structure before separation and defining a separation area located between said valves, and a frangible part on said assembly between said fittings, said rod means being so connected to said valves that it will separate at said area in response to breaking of said part thereby freeing the hold on said valves and allowing said valves to close under spring pressure to prevent leakage from the connected parts.

2. The combination according to claim 1, said valves comprising poppet valves, and a rubber liner extending through said body-fitting assembly and bonded only at its ends to the fittings, whereby said liner may stretch in response to partial separation of said frangible part to prevent leakage therefrom.

3. The combination according to claim 2, the ends of said rubber liner providing seats for said poppet valves.

4. The combination according to claim 1, said rod means for holding the valves in their open positions comprising a two-section rod seated in facing recesses on said valves, the abutting ends of the rod sections being scarfed and connected by a shearpin, whereby a compressive force on said rod will cause the sections thereof to separate.

5. The combination according to claim 4, said valves comprising poppet valve, guides slidably supporting said poppet valves, and retaining rings holding said guides in said fittings the guides having portions engageable with said poppet valves to create said compressive force on said two-section rod, the outer edges of said guides having arcuate grooves engageable with said retaining rings to urge them outwardly against said fittings as a reaction to said compressive force, whereby said retaining rings cannot become dislodged.

6. The combination according to claim 1, one of said fittings having a section extending into a bore in a section of the other fitting, and radially extending circumferentially spaced shearpins connecting said last-mentioned fitting sections, whereby a tensile force created between the two fittings as the result of a crash will cause said last-mentioned shearpins to fracture so that said rod means becomes dislodged from said valves, permitting them to close.

7. In a coupling for preventing fluid leakage in the event of a crash, a body-fitting assembly having fittings at its opposite ends, means on said fittings for securing the assembly to two fluid-carrying parts, a pair of valves carried by said fittings, springs urging said valves toward their closed positions, a rod extending between the valves and holding them in their open position, and a frangible part on said assembly between said fittings, said rod being so connected to said valves that it will dislodge itself from the valves in response to breaking of said part, whereby the valves will close to prevent leakage from the connected parts, said valves comprising poppet valves, and a rubber liner extending through said body-fitting assembly and bonded only at its ends to the fittings, whereby said liner may stretch in response to partial separation of said frangible part to prevent leakage therefrom.

* * * * *